US008677635B1

(12) United States Patent
Jones

(10) Patent No.: US 8,677,635 B1
(45) Date of Patent: *Mar. 25, 2014

(54) TAILORING POINT-TO-POINT MEASUREMENT TOOL

(71) Applicant: Drew Thomas Jones, Hurst, TX (US)

(72) Inventor: Drew Thomas Jones, Hurst, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/758,313

(22) Filed: Feb. 4, 2013

Related U.S. Application Data

(63) Continuation of application No. 12/950,229, filed on Nov. 19, 2010, now Pat. No. 8,365,421.

(51) Int. Cl.
*G01B 3/08* (2006.01)
*G01B 3/38* (2006.01)
*A61B 5/107* (2006.01)
*B43L 7/14* (2006.01)

(52) U.S. Cl.
USPC .................................. 33/2 R; 33/811; 33/512

(58) Field of Classification Search
USPC ............ 33/2 R, 3 R, 3 A, 783, 806, 809, 810, 33/811, 812, 512
See application file for complete search history.

(56) References Cited

U.S. PATENT DOCUMENTS

| 45,780 | A | 1/1865 | West |
| 224,401 | A | 2/1880 | Derickson |
| 586,406 | A | 7/1897 | Vaughn |
| 688,303 | A | 12/1901 | Griffen |
| 794,506 | A | 7/1905 | Kaiser |
| 1,238,045 | A | 8/1917 | Nelson |
| 1,435,275 | A | 11/1922 | Berriman |
| 1,636,036 | A | 7/1927 | Bartlett |
| 1,946,075 | A | 2/1934 | Huebschle |
| 4,203,227 | A | 5/1980 | Giroux |
| 5,060,393 | A | 10/1991 | Silverman et al. |
| 5,490,335 | A | 2/1996 | Chu |
| 5,642,569 | A | 7/1997 | Palmer |
| 5,873,175 | A | 2/1999 | Johnston |
| 6,003,235 | A | 12/1999 | Chen |
| 6,041,510 | A | 3/2000 | Huff |
| 6,421,927 | B1 | 7/2002 | Bach et al. |
| 7,263,783 | B2 | 9/2007 | Ochs |
| 7,770,301 | B1 | 8/2010 | Grandberry |
| 8,365,421 | B2 * | 2/2013 | Jones ............................. 33/2 R |
| 2002/0148127 | A1 | 10/2002 | Dana |
| 2005/0183276 | A1 | 8/2005 | Scarborough |
| 2006/0168834 | A1 | 8/2006 | Critelli |

* cited by examiner

*Primary Examiner* — Christopher Fulton
(74) *Attorney, Agent, or Firm* — Chris D. Thompson; Meyertons, Hood, Kivlin, Kowert & Goetzel, P.C.

(57) ABSTRACT

A point-to-point measurement tool performs the measurement of the distance between the outside surfaces of the shoulders across the back of an individual, which is associated with tailoring custom clothing and utilized to determine both the top-of-sleeve points and used to assist in determining the sleeve length measurements in tailoring custom clothing. Various embodiment of the point-to-point measurement tool can be folded, collapsed, or broken down to enable increased portability and ease of storage of the tool.

9 Claims, 15 Drawing Sheets

805

804

803

802

801

TAILORING POINT-TO-POINT MEASUREMENT TOOL

CROSS REFERENCE TO RELATED APPLICATIONS

This application is a continuation of U.S. Pat. No. 8,365,421, issued Feb. 5, 2013, which claims the benefit of U.S. Provisional Patent Application No. 61/281,509, filed Nov. 19, 2009, contents of which are incorporated herein by reference for all purposes.

FIELD

The present disclosure relates generally to tailoring measurement tools, and more particularly to tailoring measurement tools for use in the custom clothing industry used for taking an across-back-shoulder measurement sometimes referred to as the point-to-point measurement.

BACKGROUND

In the custom clothing industry, the measurement of the distance across the back and between the shoulders of an individual, known as either the shoulder-width measurement or the point-to-point measurement, is one of the defining characteristics in custom tailored menswear. It can be difficult to obtain a correct Point to Point measurement, unless customers have an existing jacket from which to measure, and usually requires the clothier to have extensive training or experience in obtaining the measurement using a tape measure.

In the absence of an existing jacket, clothiers have been required to use other measurements obtained on the customer to derive the point-to-point measurement In such an event, the point-to-point measurement is most often derived by using charts and other measurements on the customer. Such a process is more of an estimate, rather than an exact measurement. As a result, the point-to-point measurement may be slightly off, requiring the sleeve length measurement to be adjusted during second or later fittings of the custom tailored clothing. Making adjustments can be a laborious and costly process, the avoidance of which is highly desired, as an accurate fit can he extremely important for custom clothing.

Furthermore, the measuring instruments that are available to clothiers in the custom clothing industry tend to be somewhat large and unwieldy, thereby reducing their portability and adding to the burden of a clothier who wishes to use the instruments to conduct measurements at different locations. Clearly, currently available tailoring measurement tools and techniques are less than perfect.

SUMMARY

Some embodiments of the disclosure provide a tailoring measuring tool that enables a clothier, with minimal training or experience, to obtain the point-to-point measurement and sleeve length measurement with sufficient accuracy and precision as to minimize the need to make tailoring adjustments during second or later fittings of custom tailored clothing. Some such tools are also collapsible, which makes tools according to some embodiments more portable without sacrificing measurement accuracy or precision.

In one aspect of the disclosure, a point-to-point measurement tool has a caliper shaft that is made up of at least one rod marked with a measurement scale and can connect with an L-shaped detachable caliper jaw, and a caliper slide that has a caliper tip and a base element with opening to slide along the caliper shaft, such that the caliper shaft, the caliper slide and the detachable caliper jaw work in combination to obtain a point-to-point tailoring measurement representing an across-the-back shoulder-width measurement. The caliper jaw can have a lengthwise portion connected to a caliper tip that extends perpendicular to the lengthwise portion. The caliper tip can be movably connected to the lengthwise portion with a pin, the caliper slide and caliper shaft can mate via a tongue-in-groove connection, and the caliper jaw and rod can mate via a mortis and tenon connection, a hinge, a sliding rail system, or telescopic extension, such that the point-to-point measurement tool can be collapsed or broken down when not in use.

in another aspect of the disclosure, a point-to-point measurement tool has a caliper shaft made up of at least two rods each marked with a measurement scale and can connect another rod. In addition, the point-to-point measurement tool has at least two caliper slides that are made up of a base element that has an opening to slidably engage the caliper shaft and a caliper tip. The caliper tips can be movably attached to the base element using a pin, the caliper slides and caliper shaft can connect with a tongue-in-groove connection, and the rods of the caliper shaft can connect using a mortis and tenon connection, a sliding rail system, a hinge, or telescopic extension, such that the point-to-point measurement tool can be collapsed or broken down when not in use.

Another aspect of the disclosure features a point-to-point measurement tool that has an interior shaft made up of a rod and a caliper tip and an exterior shaft made up of a caliper tip, a first tube piece that has a first groove, and a second tube piece that has a second groove and a measurement scale. The second tube piece can be connected to the first tube piece via a hinge, and the interior shaft can connect with the exterior shaft via a sliding rail connection, such that the second tube piece can be folded when the tool is not in use.

Another aspect of the disclosure features a method of utilizing an embodiment of the point-to-point measurement tool to obtain the point-to-point measurement, determine the top-of-sleeve points, and obtain the sleeve length measurements.

BRIEF DESCRIPTION OF THE DRAWINGS

Aspects of this disclosure will become apparent upon reading the following detailed description and upon reference to the accompanying drawings, in which like references may indicate similar elements.

DETAILED DESCRIPTION

The following is a detailed description of embodiments of the disclosure depicted in the accompanying drawings. The embodiments are described in such detail as to clearly communicate to one of ordinary skill how to make and use the claimed invention. However, the amount of detail offered is not intended to limit the anticipated variations of embodiments; on the contrary, the intention is to cover all modifications, equivalents, and alternatives falling within the spirit and scope of the present disclosure as defined by the appended claims.

Figure 1:
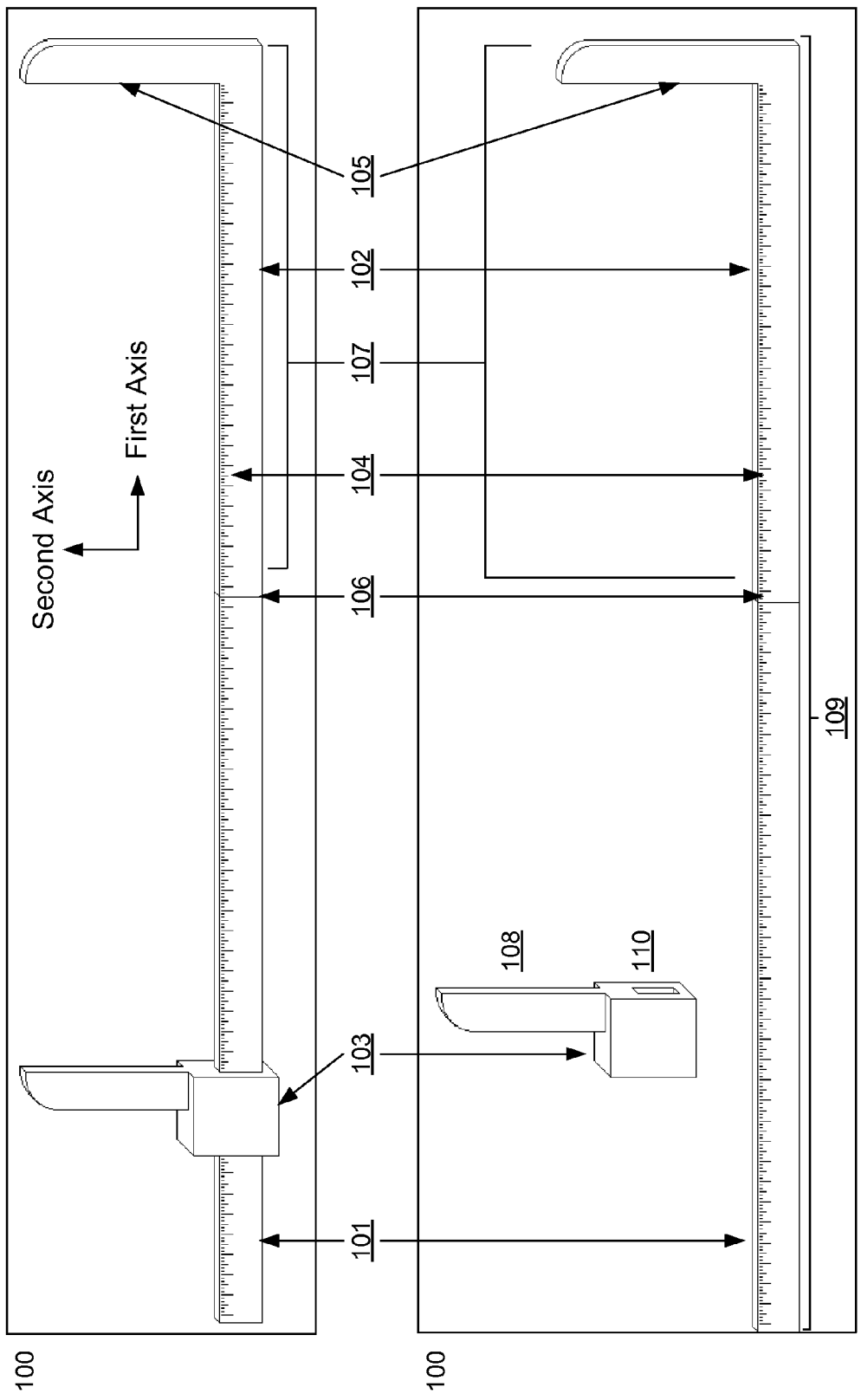
FIG. 1 depicts a point-to-point measurement tool according to various embodiments of the present disclosure.

Referring first to FIG. 1, embodiments of the point-to-point measurement tool are illustrated and discussed. Point-to-point measurement tool 100 includes at least one caliper shaft 109 made up of rod 101, caliper jaw 107, and caliper slide 103. The point-to-point measurement tool 100 can be configured to enable the rod 101 and caliper jaw 107 to be attached at an interface point 106 between one edge of each the rod 101 and the caliper jaw 107. Attachment can occur through the application of various attachment systems between the edges, and the pieces can be removed from attachment to enable the point-to-point measurement tool 100 to be broken down for transport or storage.

Caliper jaw 107, as illustrated, can be made up of a lengthwise portion 102 that extends along the same first axis as rod 101 and a caliper tip 105 that extends along a second axis perpendicular to rod 101 and caliper jaw 107. Caliper slide 103 can be made up of caliper tip 108 and base element 110. Both lengthwise portion 102 and rod 101 can include a measurement scale 104, which marks out units of length along the first axis of the caliper shaft 109. The point-to-point measurement tool 100 can also be configured to enable caliper slide 103 to be attached to the caliper shaft 109. Note that in at least one embodiment, caliper slide 103 is a second caliper jaw configured to slidably engage rod 101 via a tongue in groove connection, a mortise and tenon type connection, or otherwise. The second caliper jaw can be constructed to allow caliper slide 103 to slide along the entire length of both rod 101 and lengthwise portion 102, although in some embodiments the second caliper jaw or the rod 101 and/or lengthwise portion 102 are configured to permit free movement of caliper slide 103 along rod 101, lengthwise portion 102, or particular portions thereof. Attachment can occur through the application of various attachment systems, and the caliper slide 103 can configured to be removed from attachment.

In at least one embodiment, caliper jaw 107 includes one of two caliper jaws, and is detachable from rod 101. As illustrated, caliper jaw 107 is an L-shaped member that includes a lengthwise portion, e.g. lengthwise portion 102, similar in length to the length of a longitudinal member, such as rod 101. In other embodiments lengthwise portion 102 may be essentially a stub, or may be omitted altogether.

Figure 2:
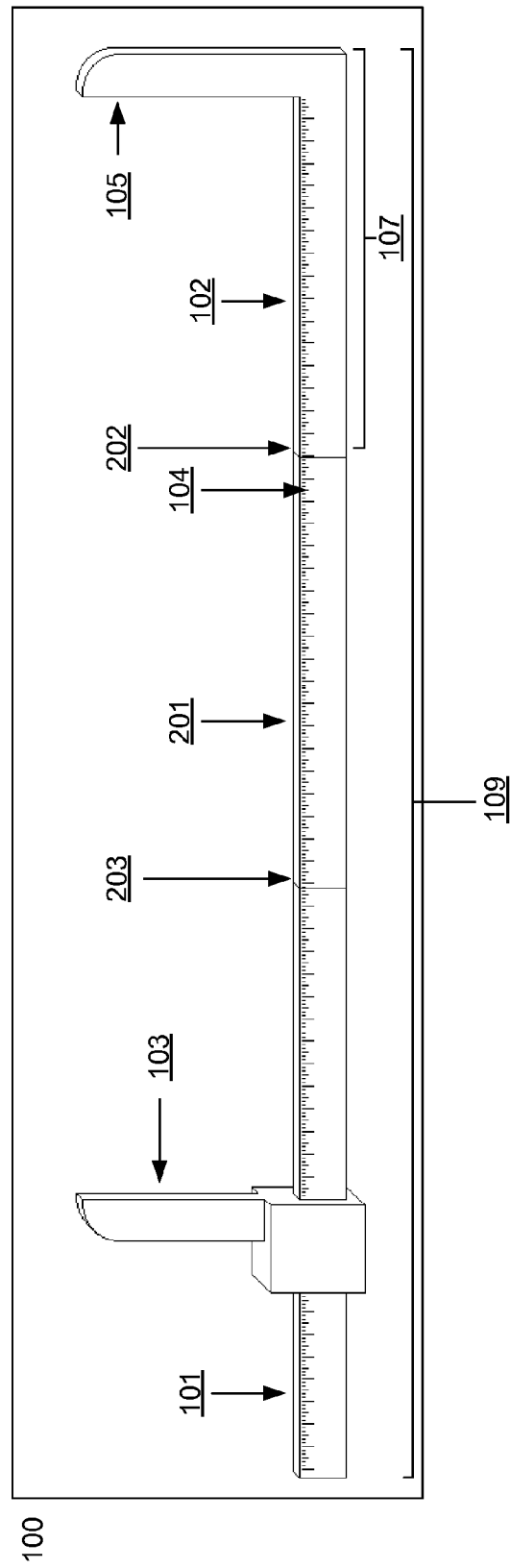
FIG. 2 depicts a point-to-point measurement tool according to various embodiments of the present disclosure.

Referring now to FIG. 2, another embodiment of the point-to-point measurement tool 100 includes a caliper shaft 109 made up of rod 101, rod 201, and caliper jaw 107. The point-to-point measurement tool 100 can be configured to enable the caliper jaw 107 and rod 201 to be attached at an interface point 202 between one edge of each element; rods 101 and 201 may be attached at an interface point 203 between one edge of each rod. Attachment can occur through the application of various attachment systems between the edges, and the elements can be removed from attachment to enable the point-to-point measurement tool 100 to be broken down for transport or storage.

Figure 3:
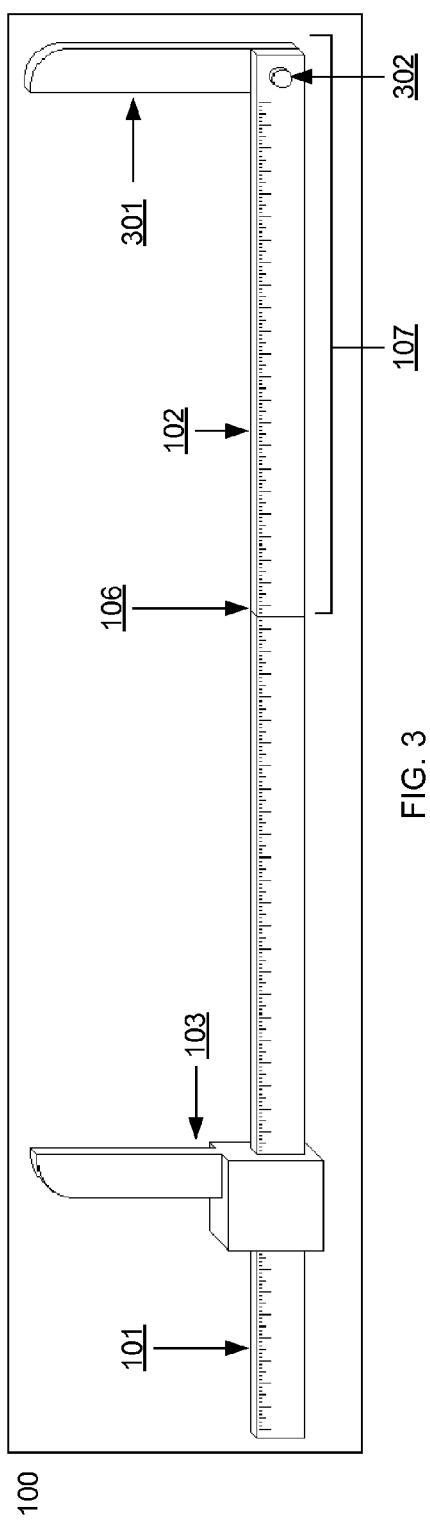
FIG. 3 depicts a point-to-point measurement tool according to various embodiments of the present disclosure.

As shown in FIG. 3, an embodiment of the point-to-point measurement tool 100 can be configured to include caliper tip 301 of caliper jaw 107 attached to lengthwise portion 102 with a pin 302. This enables the caliper tip 301 to be folded when the point-to-point measurement tool 100 is not in use, thereby increasing the portability and ease of transportation and storage of the point-to-point measurement tool 100.

Figure 4:
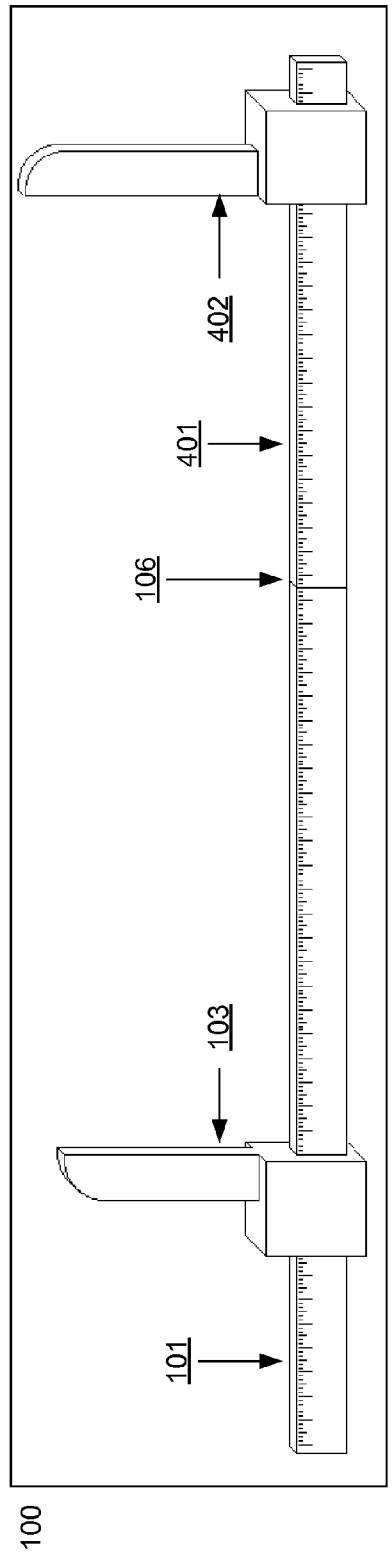
FIG. 4 depicts a point-to-point measurement tool according to various embodiments of the present disclosure.

Referring now to FIG. 4, caliper jaw 107 is replaced with rod 401 and caliper slide 402. Thus, the caliper shaft 109 can be made up of rods 101 and 401. Rod 401, like caliper jaw 107, can be attached to rod 101 at interface 106 by at least one of various attachment systems. Caliper slide 402 can be attached to the caliper shaft 109 through an attachment system, and its position on either rod can be adjusted, manually or by other means. Like caliper slide 103, caliper slide 402 can be made up of a caliper tip and a base element. In addition, caliper slide 402, like caliper slide 103, can be removed from the caliper shaft 109. In this embodiment, the point-to-point measurement tool 100 can be configured to perform the point-to-point measurement through the adjustment, manually or otherwise, of caliper slides 103 and 402, alone or in combination, until the distance between the caliper tips of the two caliper slides 103 and 402, which can be read from the measurement scale 104, corresponds to the distance between the shoulders of an individual.

Figure 5:
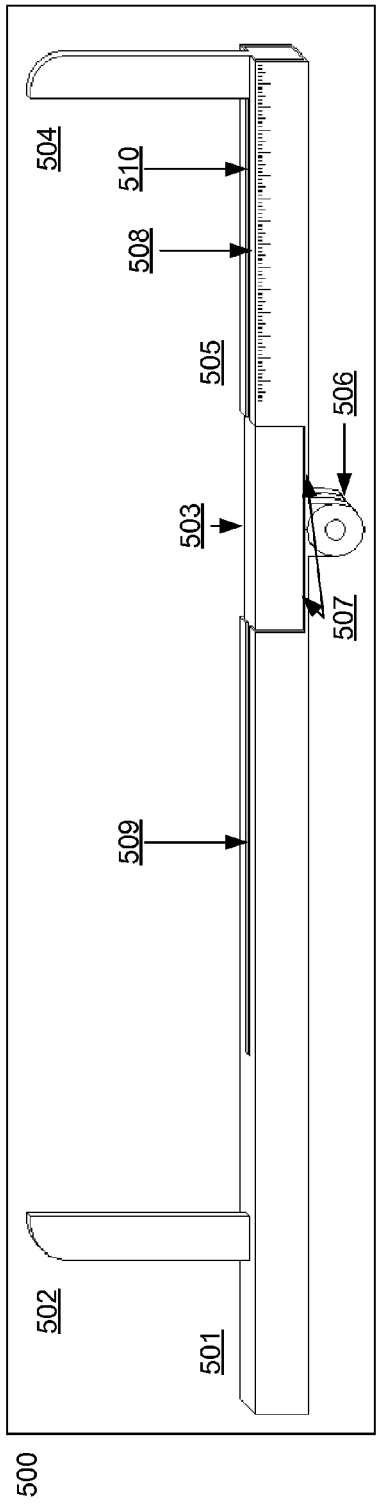
FIG. 5 depicts a point-to-point measurement tool according to various embodiments of the present disclosure.

Referring now to FIG. 5, an alternative embodiment of the point-to-point measurement tool 500 is illustrated and discussed. Point-to-point measurement tool 500 can be made up of an exterior shaft and an interior shaft. The exterior shaft can be made up of an at least partially hollow first tube piece 501, to which is attached a caliper tip 502 that extends perpendicularly from the first axis along which the first tube piece 501 extends. The first tube piece 501 also includes a first groove 509 on the same side of the tube from which the caliper tip 502 extends. The first tube piece 501 includes, on at least another side of the first tube piece 501, a lip structure 507 that attaches to a hinge 506. The hinge 506 can be attached to another lip structure 507 which is part of the second tube piece 505. The second tube piece 505 includes a measurement scale 508 and a second groove 510 on the same side of the second tube piece 505 as the first groove 509 is on the first tube piece 501. The interior shaft can be made up of a rod 503, to which is attached a caliper tip 504 that extends in a perpendicular direction from the rod 503. The interior shaft lies within the hollow space bordered by the first tube piece 501, the lip structures 507, and the second tube piece 505. The interior shaft can be adjusted, manually or otherwise, such that the caliper tip 504 is aligned with distance unit marks on the measurement scale 508 in order to obtain the point-to-point measurement. The interior shaft may also be removed from the hollow space.

Figure 6:
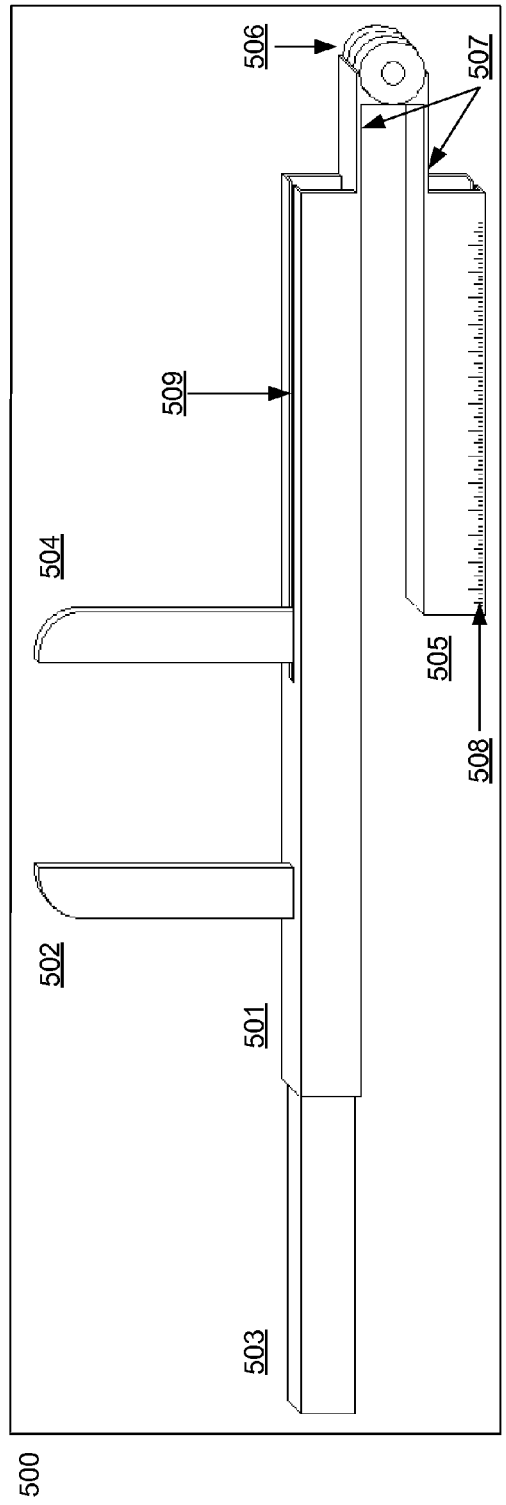
FIG. 6 depicts the point-to-point measurement tool of FIG. 5 in a configuration optimized for portability.

As shown in FIG. 6, the point-to-point measurement tool 500 may be configured for transportation or storage by adjusting the interior shaft such that it lies entirely within the first tube piece 501, and nothing lies within the second tube piece 505. The hinge 506 can then be used to fold the second tube piece 505, such that the overall length of the point-to-point measurement tool 500 can be reduced, thereby increasing the portability of the point-to-point measurement tool 500.

Figure 7:
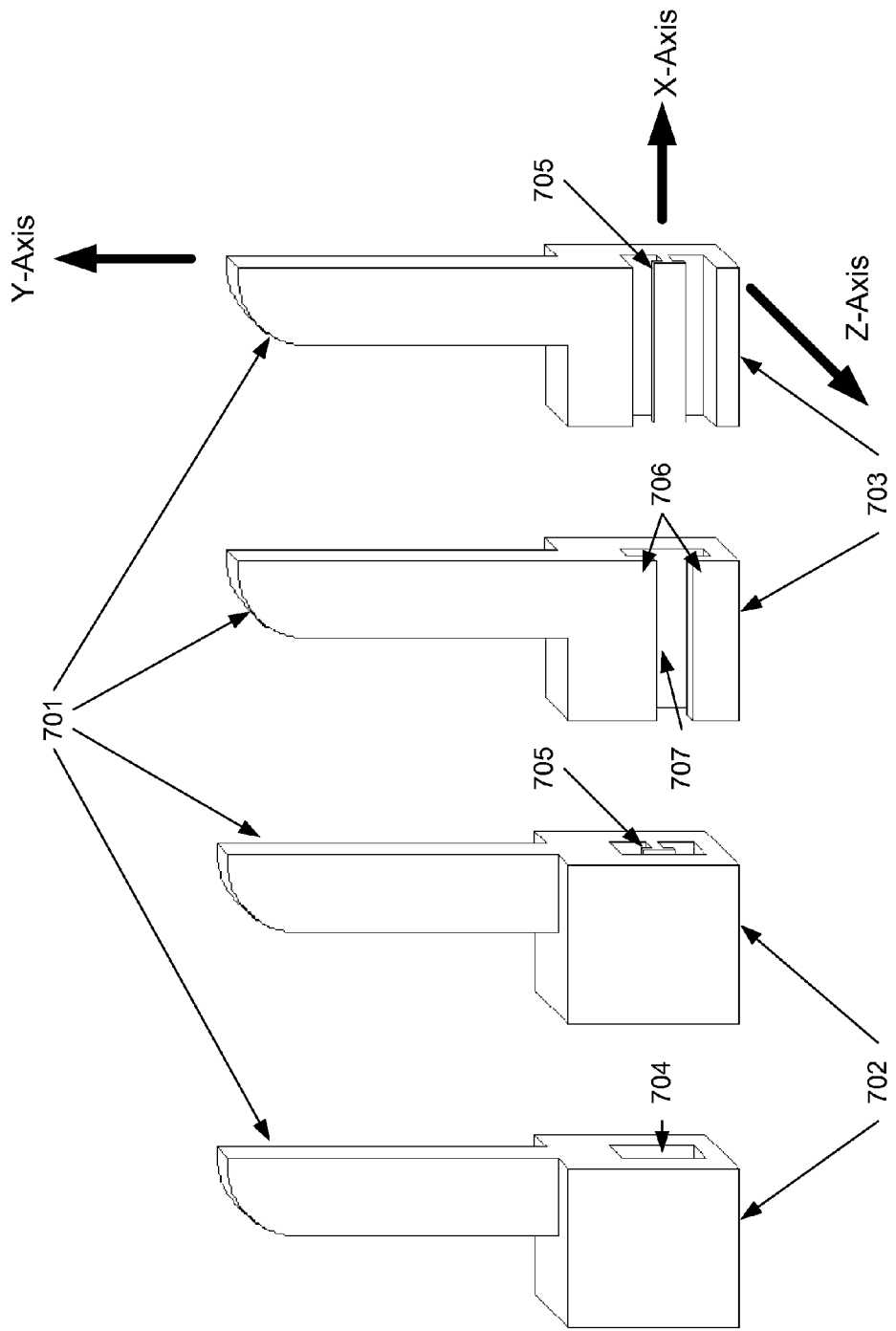
FIG. 7 depicts various embodiments of a caliper component.

As shown in FIG. 7, the various embodiments of the caliper slides can include a first part of at least one of various attachment systems to interface with a caliper shaft. Here, the illustrated attachment systems are all variations of a sliding rail attachment, which utilizes material constraints to hold the caliper slide's position in the Y-axis and Z-axis, while utilizing the sliding friction over the surface area of the contact between the components to hold the caliper slide's position in the X-axis. The illustrated caliper slides may each include a caliper tip 701. The caliper slides may include a thick base element 702 that will completely enclose a caliper shaft, or a thinner base element 703 that will only partially enclose the caliper shaft. While the thicker base element 702 might enable the caliper slide to be more securely fixed to a specific point on the X-axis, the thinner base element 703 can enable the caliper slide to be more easily adjusted along the X-axis. Various rail attachment systems can include a simple orifice 704, a rail 705 that protrudes from the caliper slide into a corresponding trough in the caliper shaft, or a partially-enclosed trough 707 that utilizes lip structures 706 to keep the caliper slide from moving in the Y-axis or Z-axis with respect to the caliper shaft. Note that, where caliper slides are present on the same point-to-point measurement tool, the caliper slides may be configured to have different attachment systems.

Figure 8:
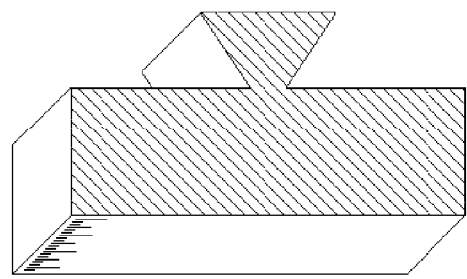
FIG. 8 depicts various embodiments of the cross-section of a long component.
Figure 8:
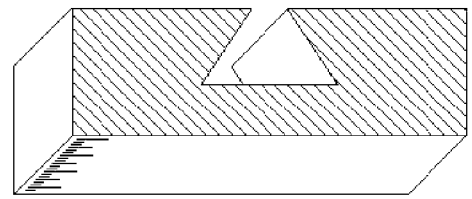
Figure 8:
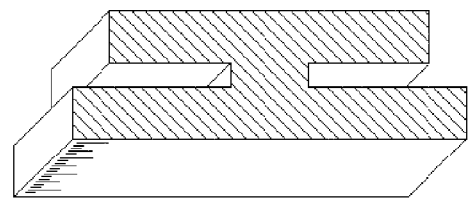
Figure 8:
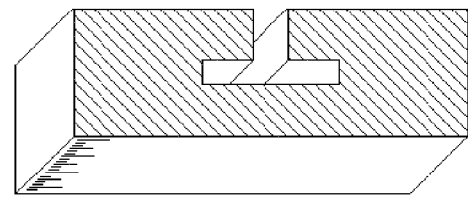
Figure 8:
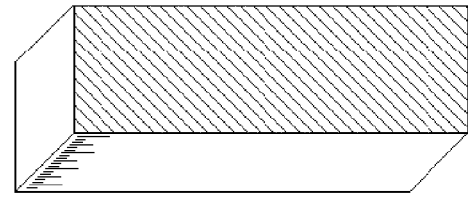

As shown in FIG. 8, a caliper shaft can be configured to accommodate various caliper slide configurations. The caliper shaft can include a solid cross-section 801 for an embodiment of the caliper shaft inserted into an orifice 704 (FIG. 7) on the caliper slides. A trough 802 cross-section can enable the caliper shaft to interface with a protruding-rail attachment system 705 (FIG. 7), which can take different shapes, including trough cross-section 804. In addition, the caliper shaft cross-section can include a protruding rail system, such as cross-section 803 to receive the lip structures 706 (FIG. 7) of a partially-enclosed trough 707 (FIG. 7). Alternatively, the protruding rail can take various shapes, including cross-section 805. Note that, where caliper slides are present on the same point-to-point measurement tool, the caliper shaft may be configured to have multiple attachment systems for different interfaces with different caliper slides.

Figure 9:
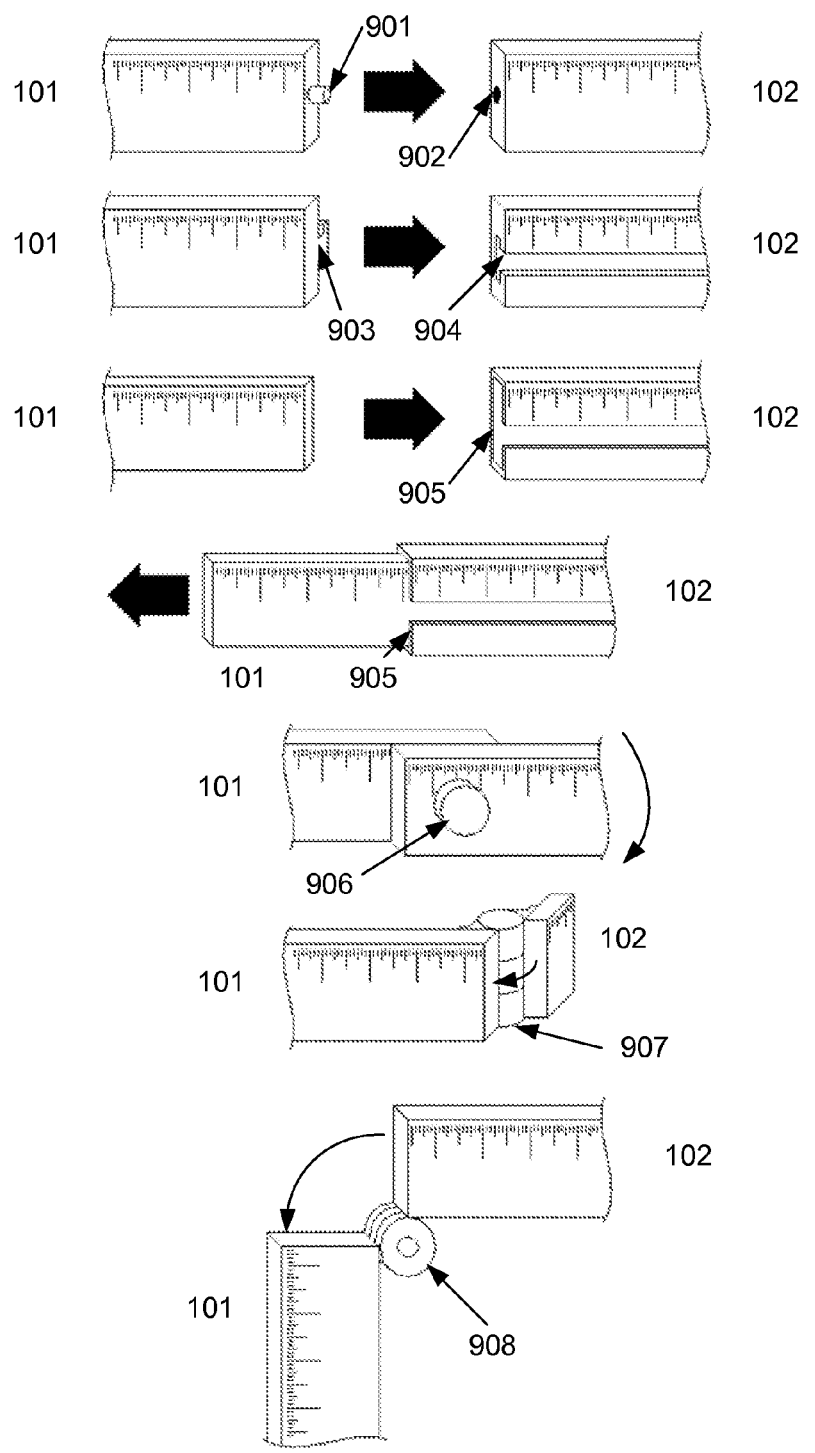
FIG. 9 depicts various embodiments of the attachment of long components.

Referring next to FIG. 9, a male/female attachment system may utilize a male element 901 secured to a female element 902 by friction. Alternatively, a sliding rail system, can include a protruding rail 903 on one piece received into a trough 904 on a corresponding element. Some embodiments include a wider trough 905 on one larger piece 102 that enables the larger to receive the entire cross section of the other smaller piece such that the smaller piece is at least partially enclosed by the larger piece and can be extended out from the larger piece by hand or other means. Yet another embodiment utilizes hinges to provide a hinged attachment that enables the caliper shaft to be folded when the point-to-point measurement tool 100 is not in use. These hinges can include hinges 906, 907, and 908. Note that the above-discussed attachment systems can be used for interfaces between any elements that make up the caliper shaft or other assemblable elements.

Figure 10:
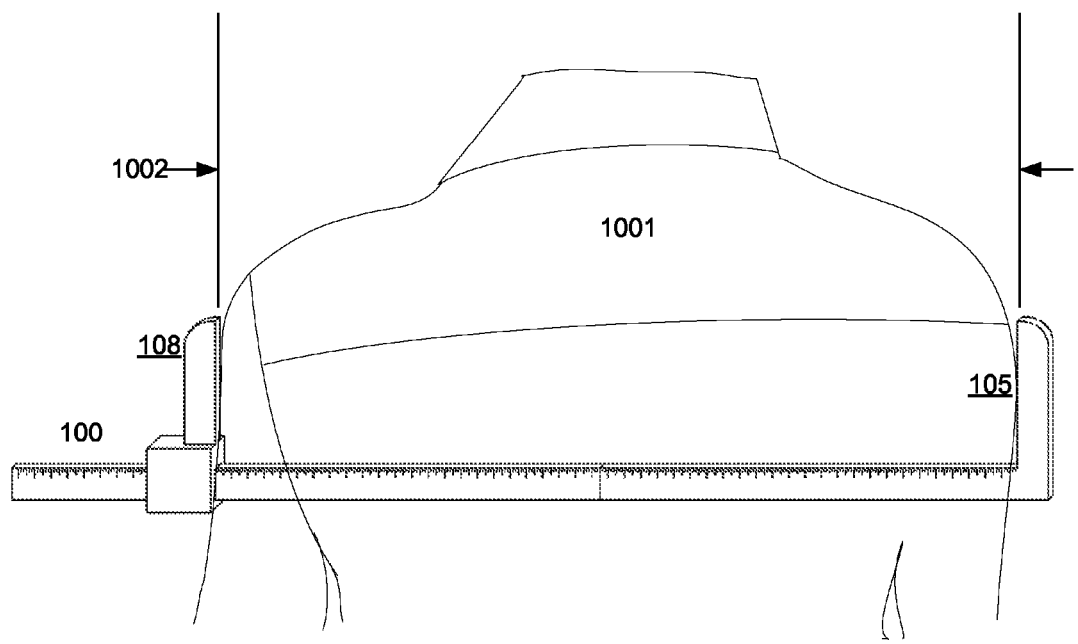
FIG. 10 depicts application of an embodiment of the point-to-point measurement tool to performing a point-to-point measurement.

As shown in FIG. 10, the point-to-point measurement tool 100 can be configured to perform the point-to-point measurement by adjusting caliper slide 103 along the length of the caliper shaft until caliper tips 108 and 105 are touching opposing points of contact on outside shoulder surfaces of the individual 1001 for whom the point-to-point measurement 1002 is being obtained, at which point the distance between the outside surfaces of the two shoulders 1002 can be obtained from the measurement scale 104, or other means such as an electronic or electromechanical gauge, as the distance from caliper tip 105 to caliper tip 108.

Figure 11:
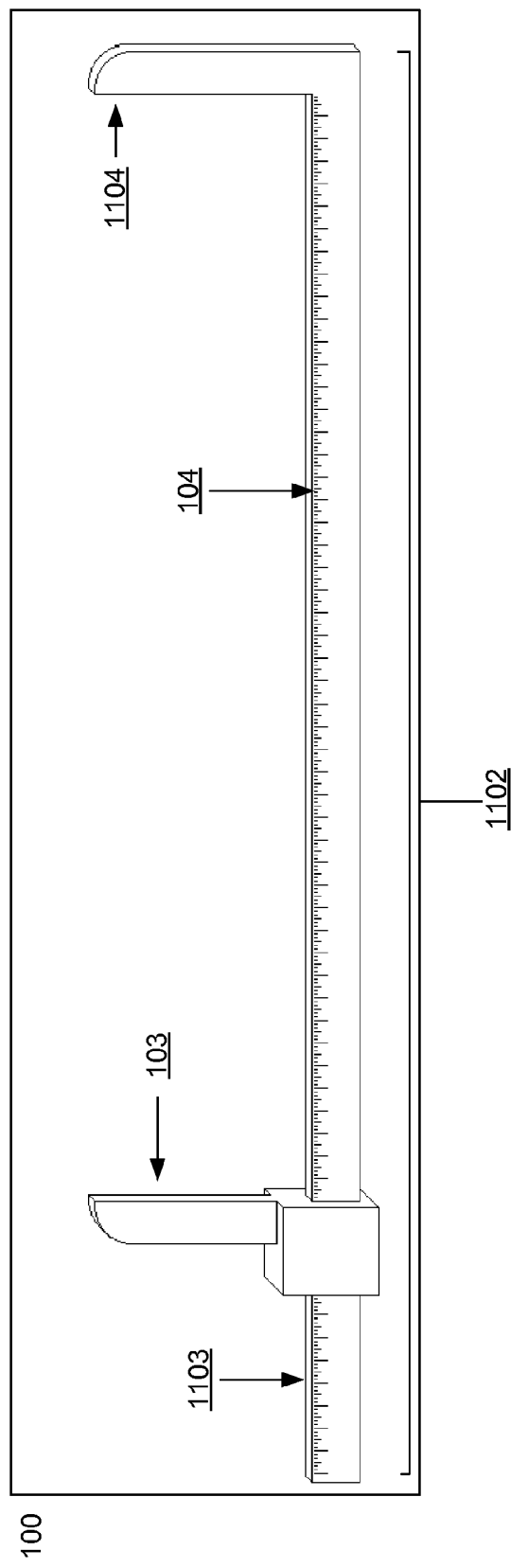
FIG. 11 depicts a point to-point measurement tool according to various embodiments of the present disclosure.

Also, as shown in FIG. 11, the point-to-point measurement tool 100 can include a caliper shaft 1102 made up of rod 1103 and caliper tip 1104. Rod 1103 can include a measurement scale 104, which marks out units of length along the first axis of the caliper shaft 1102. The point-to-point measurement tool 100 can also be configured to enable caliper jaw 103 to be attached to the caliper shaft 1102. Note that in at least one embodiment, caliper jaw 103 is configured to slidably engage rod 1103 via a tongue in groove connection, a mortise and tenon type connection, or otherwise. The caliper jaw can be constructed to allow caliper jaw 103 to slide along the entire length rod 1103, although in some embodiments the caliper jaw or the rod 1103 are configured to permit free movement of caliper slide 103 along rod 1103 or particular portions thereof. Attachment can occur through the application of various attachment systems, and the caliper jaw 103 can configured to be removed from attachment. The embodiment depicted in FIG. 11 is not collapsible, which can be useful if there is no need for portability or optimization of storage volume.

Figure 12:
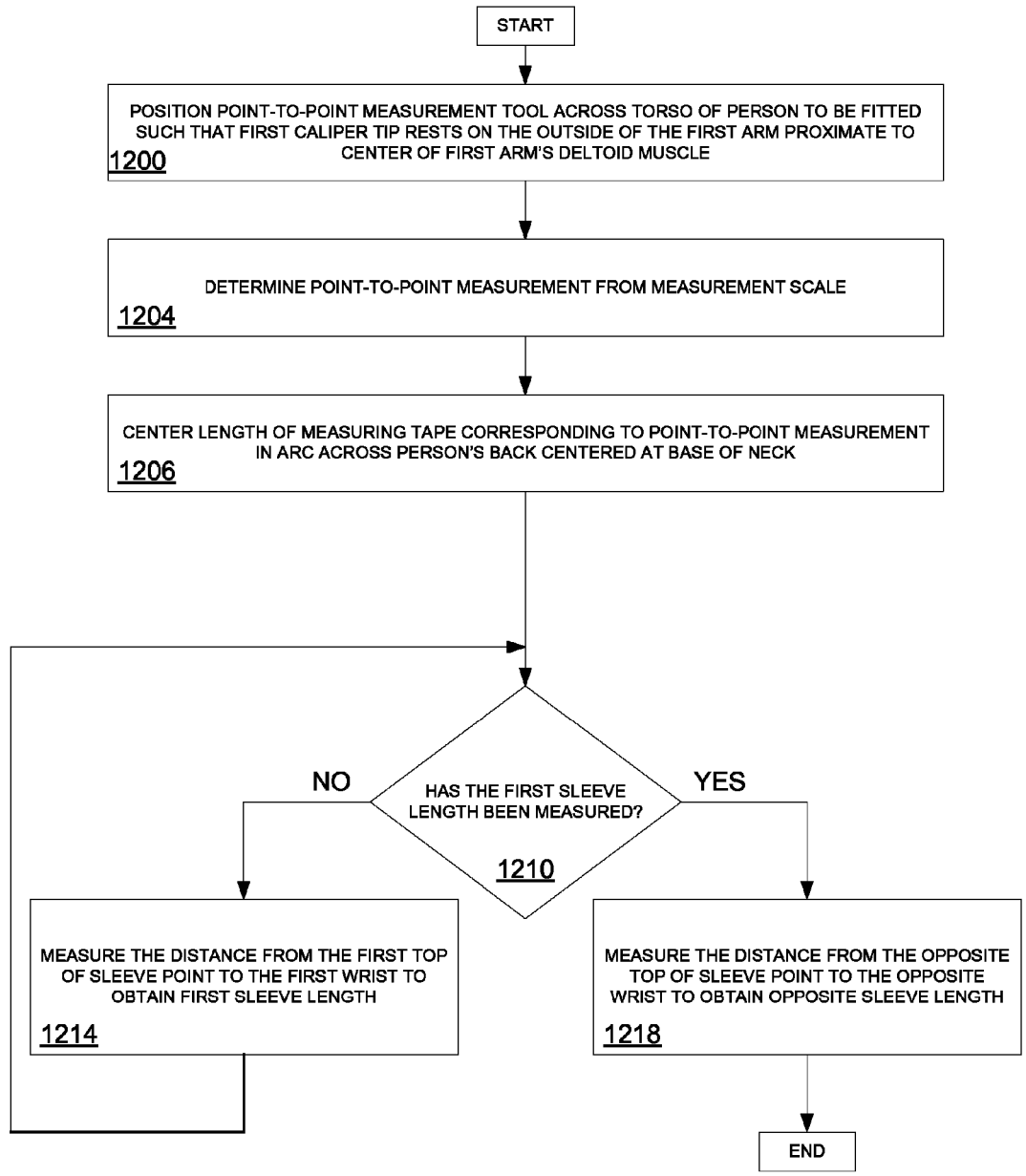
FIG. 12 depicts a flow chart illustrating the method of utilizing the point-to-point measurement tool and measuring tape to obtain the point-to-point measurement, determine the top-of-sleeve points, and obtain the sleeve length measurements on a person.

As illustrated in FIG. 12, one embodiment of utilizing the point-to-point measurement tool to obtain the point-to-point measurement begins, as shown in block 1200, with the positioning of the point-to-point measurement tool across the torso 1001 of the person being measured. The point-to-point measurement tool can be aligned such that the first caliper tip rests on the outside of the first arm proximate to the center of the first arm's deltoid muscle. The position of the second caliper tip on the point-to-point measurement tool can be adjusted, manually or otherwise, until the second caliper tip rests on the outside of the opposite arm proximate to the center of the opposite arms' deltoid muscle. As shown in block 1204, the point-to-point measurement can be obtained by reading from the measurement scale the distance between the opposing caliper tips at their respective points of contact with the opposing arms. It will be appreciated that when referring to bringing the caliper into contact with an arm, there is no requirement for skin contact. Instead, the measurement can be taken even with the arm covered by clothing.

As shown in block 1206, a length of measuring tape corresponding to the point-to-point measurement distance is centered in an arc across the persons back centered substantially at an apex of the arc and positioned substantially at the base of the person's neck. As illustrated by block 1210, if the first sleeve length has not yet been measured, the method proceeds to block 1214, where the first sleeve length measurement is performed. As further illustrated by block 1210, if the first sleeve length measurement has been performed, the second sleeve length is measured at block 1218.

Figure 13:
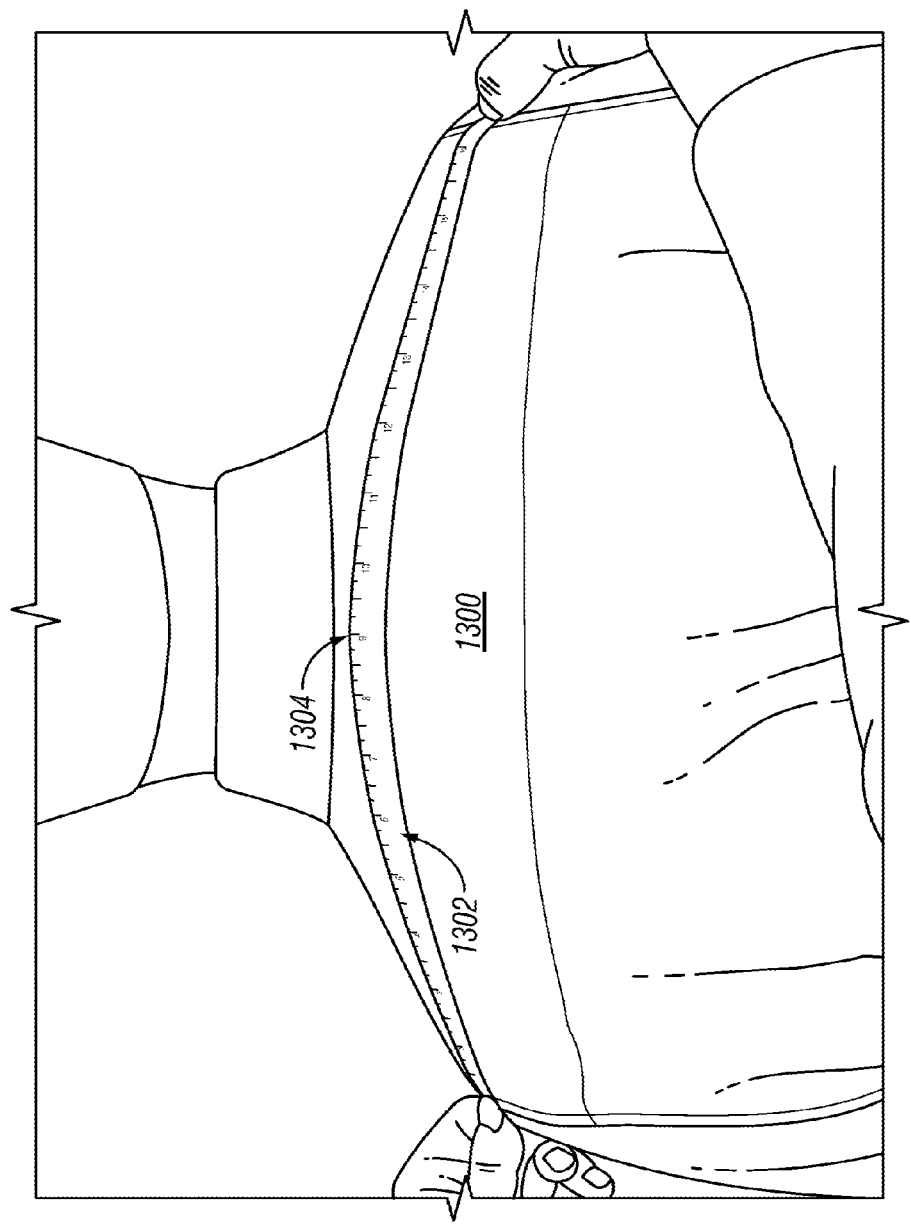
FIGS. 13 and 14 depict using the point-to-point measurement obtained with the point-to-point measurement tool to determine the top-of-sleeve points.

Referring next to FIG. 13, placement of a measuring tape, based on the point-to-point measurement taken with the point-to-point measurement tool, is illustrated. A length of measuring tape 1302 corresponding to the point-to-point measurement distance is positioned in an arc across the back 1300 of the person being fitted for custom clothing. Thus, for example, if the point-to-point measurement is 49 inches, then a 49 inch length of measuring tape is used. The arc is centered at substantially at an apex of the arc and positioned substantially at the base 1304 of the person's neck. For example, if the point-to-point measurement determined using the point-to-point measurement tool is 50 inches, the 25 inch mark of the measuring tape, which corresponds to the apex of the arc, is places at the center of the person's back, near the base of his neck. The zero inch mark on the measuring tape can then be used to indicate the top of one sleeve, while the 50 inch mark can be used to indicate the top of the opposite sleeve.

Figure 14:
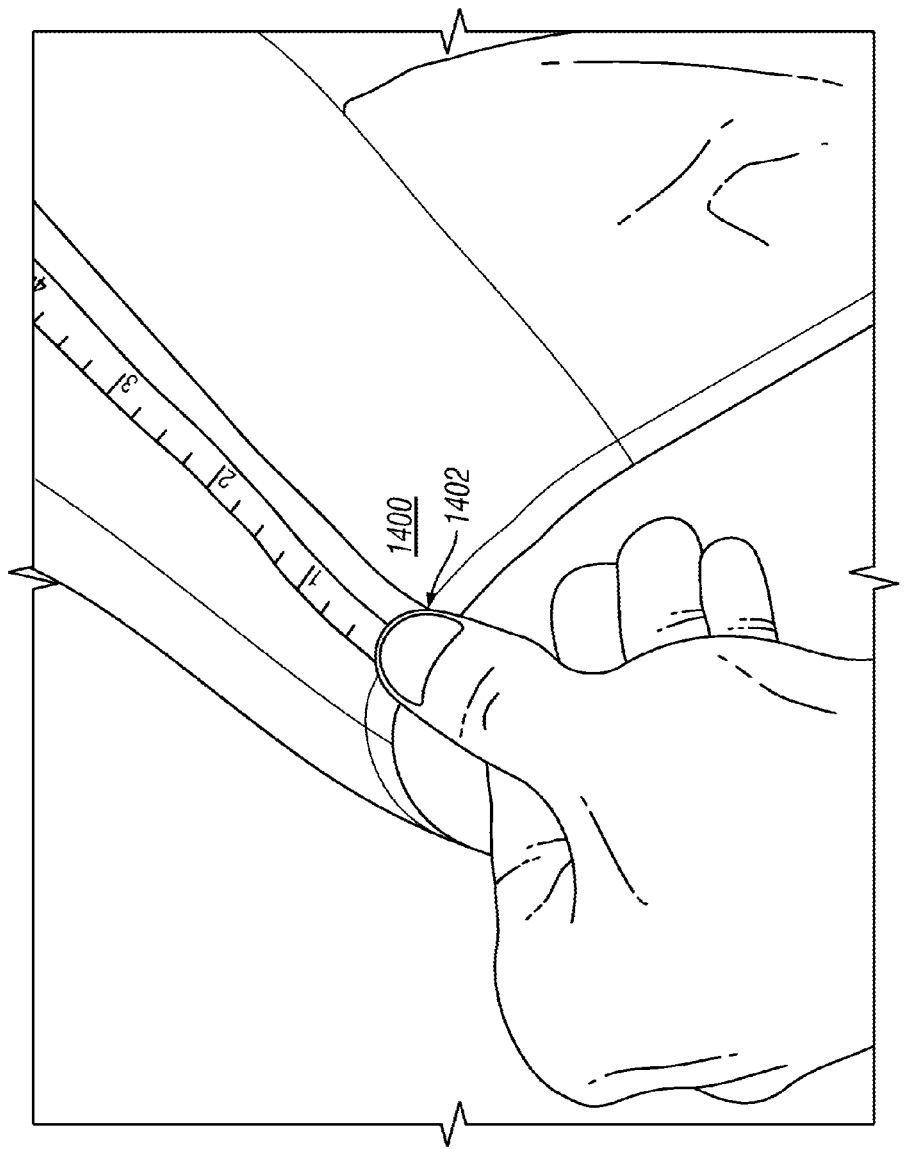

Referring next to FIG. 14, the respective ends of the length of measuring tape are placed to rest proximate to the intersection of the subject's arm and shoulder, such that the resting locations of the ends of the length of measuring tape indicate the first and opposite, or right and left, tops of sleeve points. One end 1400, of the measuring tape indicates the proper location 1402 top of one sleeve.

Figure 15:
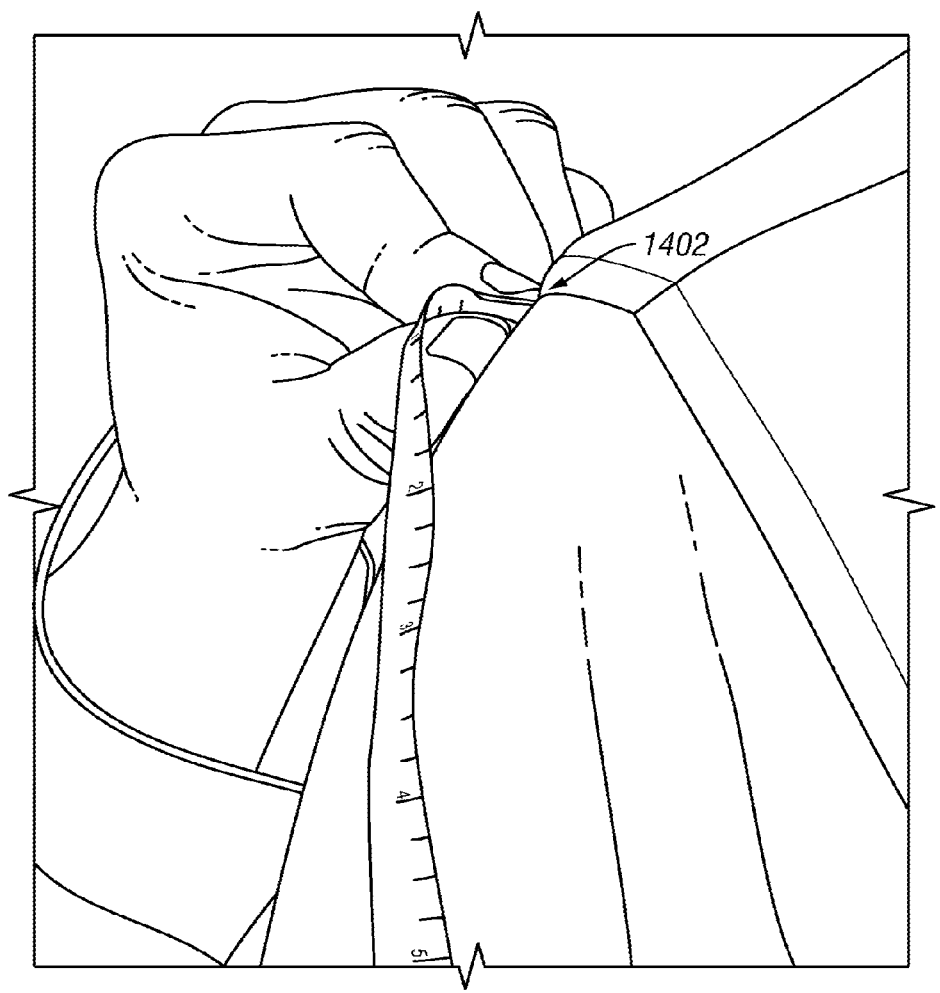
FIGS. 15-17 depict using the top-of-sleeve point, determined using a point-to-point measurement tool, to determine the sleeve length measurements.
Figure 16:
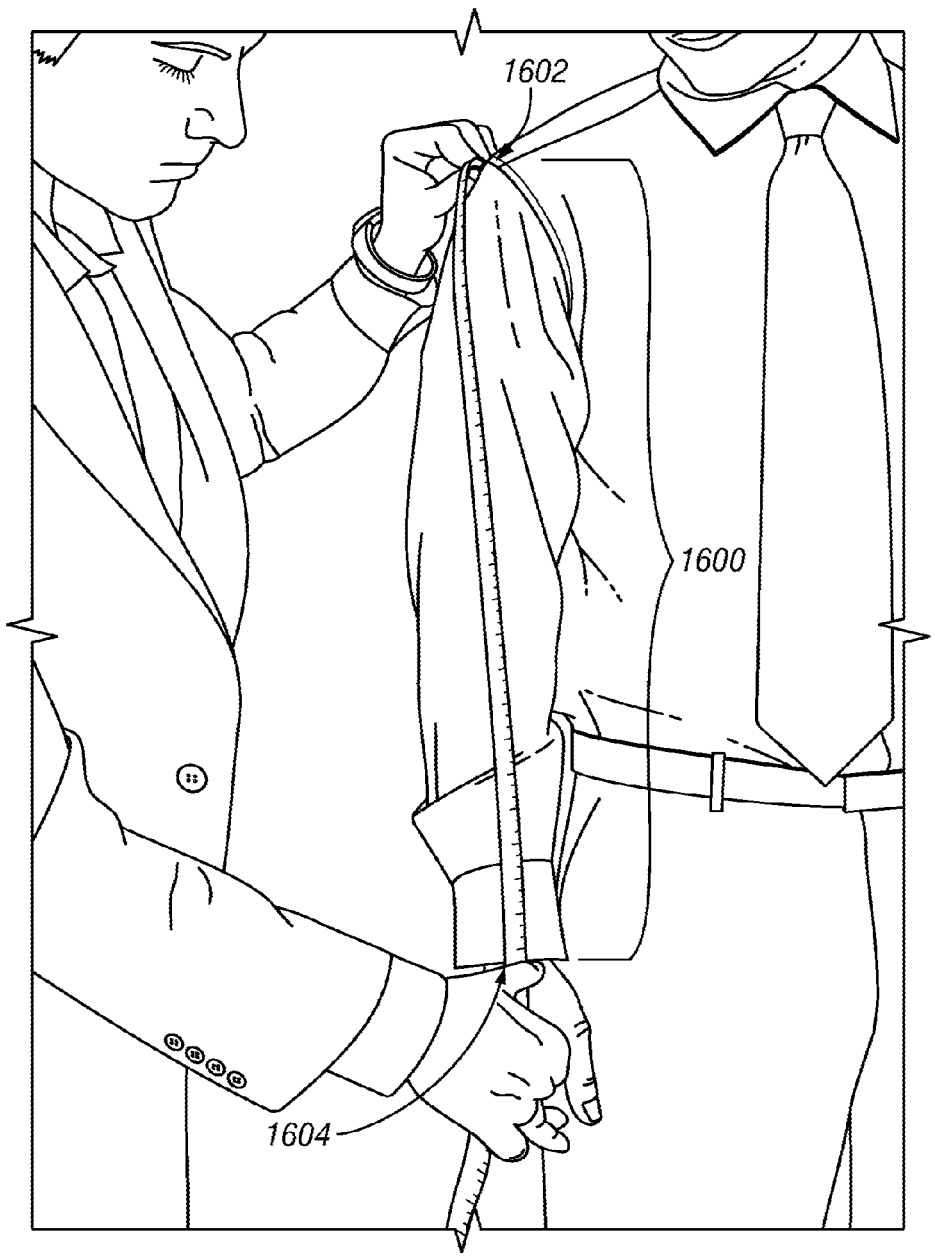
Figure 17:
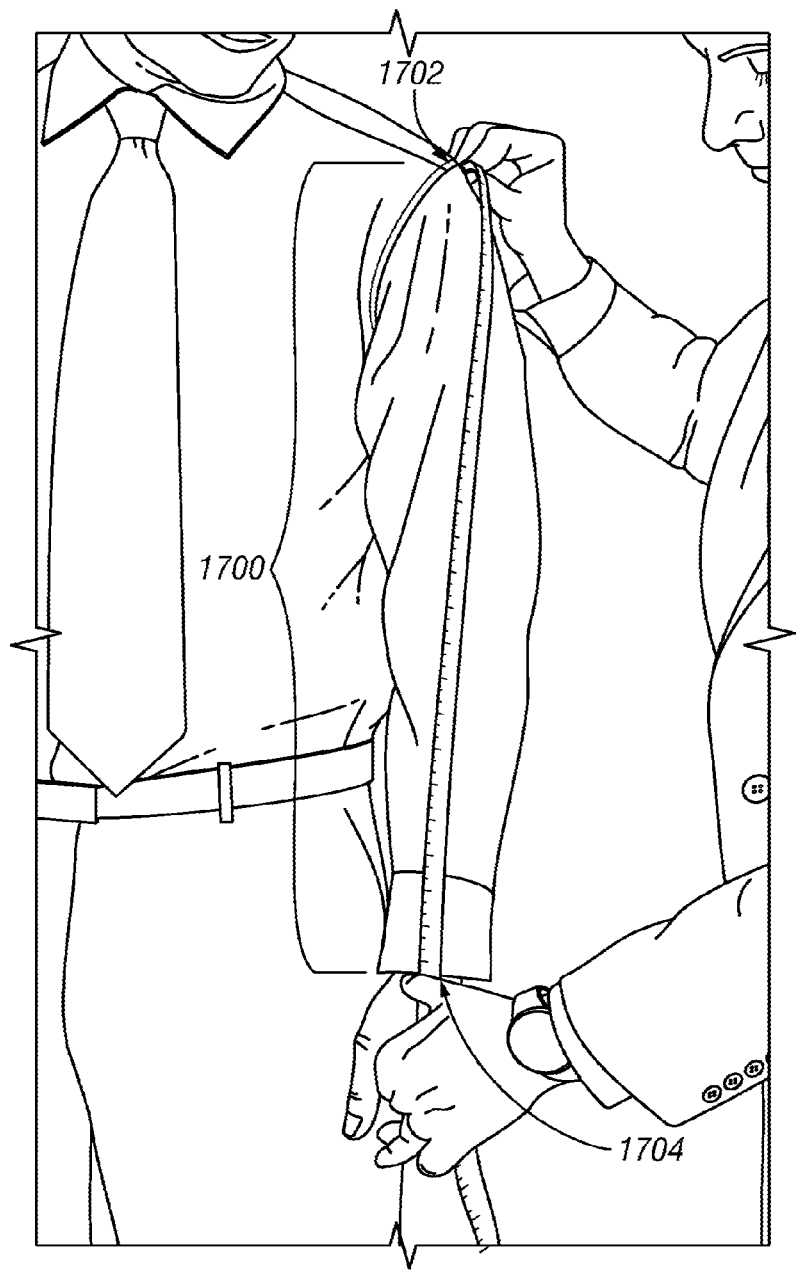

Once the first and opposite top-of-sleeve points have been determined, the sleeve length can be measured. Referring next to FIGS. 15-17, a procedure for using the measuring tape to determine the sleeve length is illustrated. FIG. 15 illustrates pivoting the measuring tape around a top-of-sleeve point 1402 in preparation for taking a sleeve measurement. As illustrated in FIG. 16, the first sleeve length measurement can be determined by measuring the distance 1600 between the first top-of-sleeve point 1602 and the first wrist 1604. As illustrated in FIG. 17, the second sleeve length measurement can be determined from the distance 1700 between the opposite top-of-sleeve point 1702 and the opposite wrist 1704.

it will be understood that the point-to-point measurement tool 100 may include other components, pieces, members, or interfaces without departing from the scope of the present disclosure. For example, although the above embodiments discuss point-to-point measurement tools having a scale marked on a rod, bar, beam, cross-member etc., other embodiments utilizing electronic or electromechanical distance readouts can also be used in place of, or in addition to, the marked scale. Furthermore, although particular embodiments have been discussed above, the invention is not limited to the disclosed embodiments, but includes subject matter encompassed by the scope of the appended claims.

What is claimed is:

1. A method comprising:
    positioning a point-to-point measurement tool across the torso of a person to be fitted for custom clothing, such that a first caliper tip of the point-to-point measurement tool rests on the outside of the person's first arm proximate to a center of the first arm's deltoid muscle;
    adjusting the position of the second caliper tip on the point-to-point measurement tool such that the second caliper tip rests on the outside of the person's opposite arm proximate to a center of the opposite arm's deltoid muscle;
    determining a point-to-point measurement using the point-to-point measurement tool to determine the distance between the caliper tips while the first caliper tip of the point-to-point measurement tool is resting on the outside of the person's first arm proximate to the center of the first arm's deltoid muscle and the second caliper tip is resting on the outside of the person's opposite arm proximate to the center of the opposite arm's deltoid muscle;
    centering a length of measuring tape corresponding to the determined point-to-point measurement in an arc across the person's back, with the center of the length of measuring tape substantially at an apex of the arc and positioned substantially at the base of the person's neck, and with the first and opposite ends of the length of measuring tape resting proximate to respective first and opposite intersections of the person's first and opposite arms and shoulders, wherein the location of the first end of the length of measuring tape on the person establishes an indicated first top-of-sleeve point, and wherein the location of the opposite end of the length of measuring tape on the person establishes an indicated opposite top-of-sleeve point;
    measuring from the indicated first top-of-sleeve point, as established by the location of the first end of the length of measurement tape, to the person's first wrist to determine a first sleeve length; and
    measuring from the indicated opposite top-of-sleeve point, as established by the location of the opposite end of the length of measurement tape, to the person's opposite wrist to determine an opposite sleeve length.

2. The method of claim 1, wherein the point-to-point measurement tool is collapsible.

3. The method of claim 1, wherein centering a length of measuring tape comprises making a length of tape that matches the point-to-point measurement determined between centers of the person's deltoid muscles.

4. The method of claim 1, wherein adjusting the position of the second caliper tip on the point-to-point measurement tool comprises sliding one of the caliper tips relative to the other caliper tip.

5. A method, comprising:
    determining a point-to-point measurement for a person to be fitted for custom clothing, wherein the point-to-point measurement is a measure of the distance, as measured across the torso of the person, between the outside of the person's first arm proximate to a center of the first arm's deltoid muscle and the outside of the person's opposite arm proximate to a center of the opposite arm's deltoid muscle;
    centering a length of measuring tape corresponding to the determined point-to-point measurement in an arc across the person's back, with the center of the length of measuring tape substantially at an apex of the arc and positioned substantially at the base of the person's neck, and with the first and opposite ends of the length of measuring tape resting proximate to respective first and opposite intersections of the person's first and opposite arms and shoulders, wherein the location of the first end of the length of measuring tape on the person establishes an indicated first top-of-sleeve point; and
    measuring from the indicated first top-of-sleeve point, as established by the location of the first end of the length of measurement tape, to the person's first wrist to determine a first sleeve length.

6. The method of claim 5, wherein the location of the opposite end of the length of measuring tape on the person establishes an indicated opposite top-of-sleeve point, the method further comprising measuring from the indicated opposite top-of-sleeve point, as established by the location of the opposite end of the length of measurement tape, to the person's opposite wrist to determine an opposite sleeve length.

7. The method of claim 5, wherein determining the point-to-point measurement comprises:
    positioning a point-to-point measurement tool across the torso of the person, such that a first caliper tip of the point-to-point measurement tool rests on the outside of the person's first arm proximate to a center of the first arm's deltoid muscle;
    adjusting the position of the second caliper tip on the point-to-point measurement tool such that the second caliper tip rests on the outside of the person's opposite arm proximate to a center of the opposite arm's deltoid muscle; and determining a point-to-point measurement using the point-to-point measurement tool to determine the distance between the caliper tips while the first caliper tip of the point-to-point measurement tool is resting on the outside of the person's first arm proximate to the center of the first arm's deltoid muscle and the second caliper tip is resting on the outside of the person's opposite arm proximate to the center of the opposite arm's deltoid muscle.

8. The method of claim 7, wherein the point-to-point measurement tool is collapsible.

9. The method of claim 5, wherein centering the length of measuring tape comprises making a length of tape that matches the point-to-point measurement determined between centers of the person's deltoid muscles.

\* \* \* \* \*